US012682050B2

(12) United States Patent
Gurumurthi et al.

(10) Patent No.: US 12,682,050 B2
(45) Date of Patent: Jul. 14, 2026

(54) PROCESSOR SUPPORT FOR SOFTWARE-LEVEL CONTAINMENT OF ROW HAMMER ATTACKS

(71) Applicant: Advanced Micro Devices, Inc., Santa Clara, CA (US)

(72) Inventors: Sudhanva Gurumurthi, Austin, TX (US); Vilas Sridharan, Jamaica Plain, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 605 days.

(21) Appl. No.: 17/559,520

(22) Filed: Dec. 22, 2021

(65) Prior Publication Data

US 2023/0195889 A1    Jun. 22, 2023

(51) Int. Cl.
| | |
|---|---|
| *G06F 21/55* | (2013.01) |
| *G06F 21/79* | (2013.01) |
| *G11C 11/406* | (2006.01) |

(52) U.S. Cl.
CPC ............ *G06F 21/554* (2013.01); *G06F 21/79* (2013.01); *G11C 11/40611* (2013.01); *G11C 11/40618* (2013.01)

(58) Field of Classification Search
CPC .. G06F 21/554; G06F 21/79; G11C 11/40611; G11C 11/40618
See application file for complete search history.

(56) References Cited

U.S. PATENT DOCUMENTS

| | | | | |
|---|---|---|---|---|
| 10,599,504 B1 * | 3/2020 | BeSerra | ............. | G06F 11/3055 |
| 11,011,215 B1 * | 5/2021 | Parry | .................. | G06F 13/1668 |
| 11,961,548 B2 * | 4/2024 | Kim | ....................... | G11C 11/408 |
| 2020/0004617 A1 * | 1/2020 | Handa | ................. | G06F 11/0772 |
| 2020/0210076 A1 * | 7/2020 | Murphy | ................ | G06F 3/0688 |
| 2022/0050793 A1 * | 2/2022 | Saroiu | .................... | G06F 21/556 |
| 2022/0156159 A1 * | 5/2022 | Wang | .................. | G06F 11/0727 |
| 2022/0209933 A1 * | 6/2022 | Chhabra | ............. | G06F 12/1441 |
| 2022/0223195 A1 * | 7/2022 | Ayyapureddi | ...... | G11C 11/4078 |
| 2023/0094684 A1 * | 3/2023 | Kim | ....................... | G11C 7/1063 |
| | | | | 365/222 |
| 2023/0195889 A1 * | 6/2023 | Gurumurthi | ...... | G11C 11/40611 |
| | | | | 726/22 |
| 2024/0112722 A1 * | 4/2024 | Brandl | .............. | G11C 11/40611 |

* cited by examiner

*Primary Examiner* — Meng Li
(74) *Attorney, Agent, or Firm* — Hickman Becker Bingham Ledesma LLP

(57) ABSTRACT

A method and apparatus for mitigating row hammer attacks is provided. A row hammer alert is generated by a component of a memory architecture controlling operation of a memory device. The component may be a memory controller, coherency logic, or data fabric. The component obtains a physical address of an aggressor row that caused the alert and obtains an identifier of an execution context corresponding to the physical address. The component generates an error message for a processing device, the error message including the identifier of the execution context. The processing device retrieves the error message when performing a context switch. The processing device then generates an event received by the operating system. The operating system then takes action to reduce row hammer by the execution context, such as ending, restarting, or throttling the execution context.

2 Claims, 4 Drawing Sheets

Initiate Context Switch 402

400

Read Error Log 404

Retrieve Execution Context Identifier 406

Create Event in Execution Context 408

Set Status Bits to Indicate Delivery of Recoverable Error Notification 410

Complete Context Switch 412

PROCESSOR SUPPORT FOR SOFTWARE-LEVEL CONTAINMENT OF ROW HAMMER ATTACKS

FIELD OF THE INVENTION

The present invention relates to mitigating data corruption due to row hammer attacks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In order to achieve ever greater storage densities, memory cells of every type have become smaller and are packed closer together. Many types of memories will place many layers of memory cells on a single chip. The downside of these developments is that the conductive paths for writing to and reading from each cell have also become smaller and more tightly packed with one another and the memory cells. This creates opportunities for electrical interference in which asserting signals on the control lines for addressed memory cells may cause an unintended change in state in non-addressed memory cells. The decreasing size of the memory cells has made them even more susceptible to this problem.

Malicious actors have exploited this vulnerability to implement "row hammer" attacks in which one or more rows of memory cells are repeatedly written to or read from in a manner that will intentionally change the values stored in one or more other rows of memory cells.

Dynamic random-access memory (DRAM) is particularly susceptible to such attacks. Nonetheless, DRAM is used in many applications due to its quick access times. In DRAM, each memory cell includes a capacitor that is charged to write a binary 1 to that cell. To read the cell, the capacitor is allowed to discharge onto a sense line. The capacitors are susceptible to leakage and therefore DRAM must be refreshed periodically by reading and rewriting data stored therein. Some approaches to mitigating row hammer attacks include increasing the refresh rate for affected memory cells. However, such approaches may be overwhelmed and also impose a performance penalty.

There is therefore a need for more effective ways for mitigating row hammer attacks.

BRIEF DESCRIPTION OF THE DRAWINGS

Implementations are depicted by way of example, and not by way of limitation, in the figures of the accompanying drawings and in which like reference numerals refer to similar elements.

Implementations are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A row hammer alert is generated by a component of a memory architecture controlling operation of the memory device. The component obtains a physical address of an aggressor row that caused the alert and obtains an identifier of an execution context corresponding to the physical address. The component generates an error message for a processing device, the error message including the identifier of the execution context. The processing device retrieves the error message when performing a context switch and then generates an event received by the operating system. The operating system then takes action(s) to reduce row hammer by the execution context, such as ending, restarting, or throttling the execution context. This technical solution provides the benefits of enabling the operating system to mitigate row hammer attacks rather than relying exclusively on the memory architecture.

Memory Architecture

Figure 1:
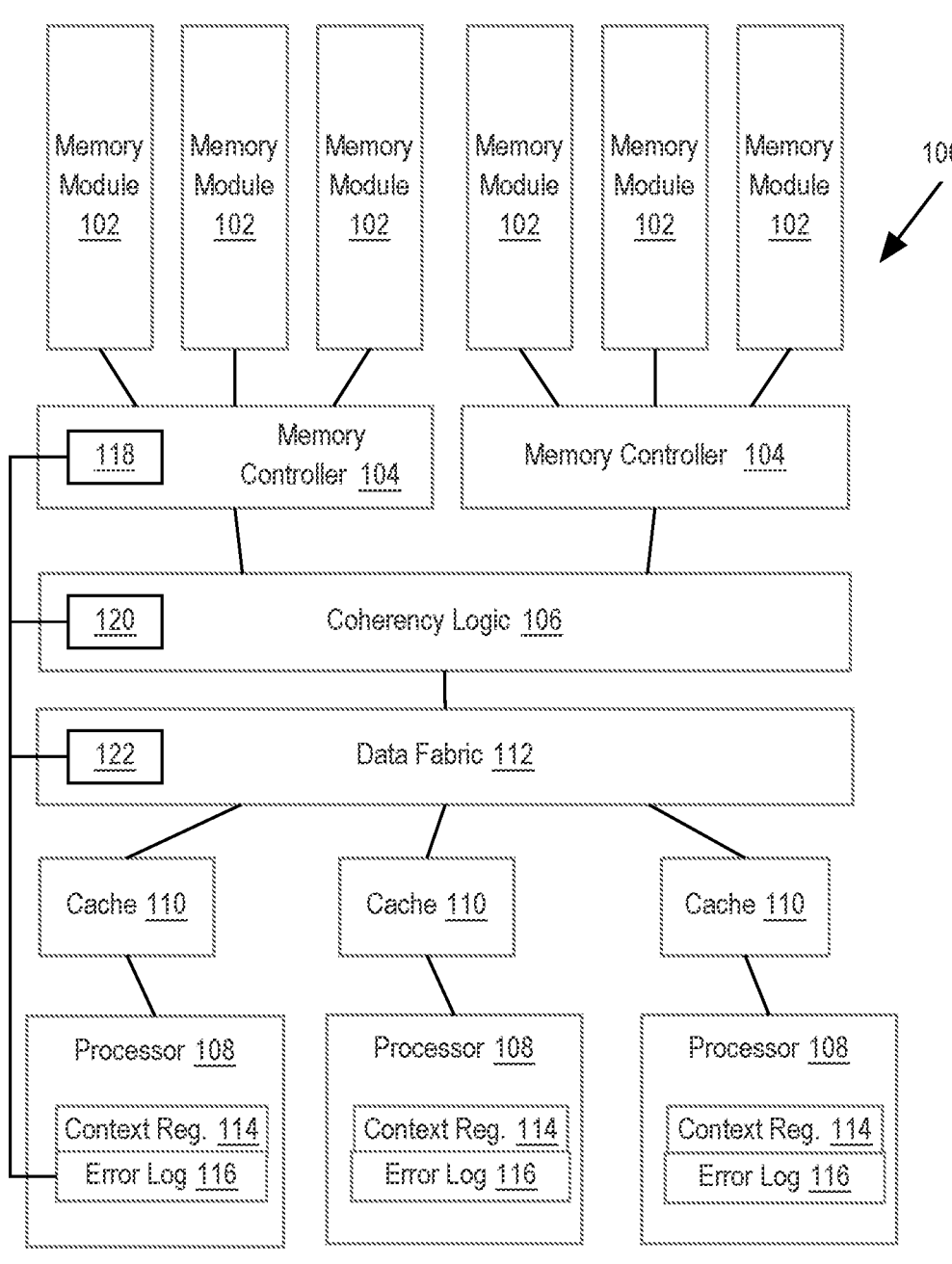
FIG. 1 is a schematic block diagram of a memory architecture in which row hammer mitigation may be performed.

The approach described herein for mitigating row hammer attacks is used in a memory architecture 100 of FIG. 1 including some or all of the depicted components, or additional components. The depicted memory architecture is one example architecture. Any memory architecture known in the art may also incorporate logic for implementing the row hammer mitigation approach described herein.

The memory architecture includes a plurality of memory modules 102. The memory modules 102 each include two- or three-dimensional arrays of memory cells, each memory cell having the capacity to store and output one or more bits of data. Each memory module 102 may further include circuits enabling row and column inputs to be translated to a physical location within each memory module 102 so that data may be written to or read from the physical location.

The memory modules 102 may be implemented as single in-line memory modules (SIMM), dual in-line memory modules (DIMM), or other form factor. The memory modules 102 include memory cells implemented as dynamic random-access memory (DRAM), static random-access memory, or other volatile memory. In some implementations, the memory modules include non-volatile memory cells, such as NAND flash memory cells.

A bank of two or more memory modules 102 is each coupled to a memory controller 104. The memory controller 104 performs such functions as translating addresses into a module index (i.e., identifier of a particular memory module 102), row index, and possibly a column index. The memory controller 104 asserts control lines to invoke reading data from or writing data to a particular address. In the case of memory modules 102 implemented as DRAM, the memory controller 104 performs refreshing of data stored in the memory modules 102.

According to an implementation, the memory controller 104 is further configured to detect row hammer attacks and, in response, generate a row hammer alert. For example, logic within the memory controller 104 includes logic tracking the frequency that each row of each memory module 102 is written to and/or read from. An algorithm implemented by the memory controller 104 may determine whether a pattern of writing to and reading from a potential aggressor row is likely to cause modification of other non-addressed rows of the memory module 102 including the aggressor row. The implementation of the algorithm varies depending upon a particular implementation and may be dependent on the properties of the memory cells making up each memory module 102. In particular, the frequency of writes and/or reads to the aggressor row that is likely to cause changes to non-addressed rows decreases as the size of the memory cells decreases and packing density of the memory cells increases.

The memory controller 104 is further configured with logic for mitigating row hammer attacks, such as by increasing the refresh rate for one or more of the memory modules 102 coupled thereto. According to an implementation, the memory controller 104 is configured to generate the row hammer alert in response to a row hammer attack exceeding the mitigation capacity of the memory controller 104, whereas row hammer attacks that are successfully mitigated by the memory controller 104 will not result in generating a row hammer alert.

One or more memory controllers 104 for one or more banks of memory modules 102 are coupled to coherency logic 106. The coherency logic 106 implements a coherency slave with respect to processors 108 that are connected to the memory architecture 100. Each processor 108 includes a cache 110, such as a level 1 (L1), level 2 (L2) and/or level 3 (L3) shared cache, although the L2 cache may also be shared. The coherency logic 106 performs tasks in response to requests from the processors 108 and/or cache controllers for caches 110 coupled to the processors 108. For example, the coherency logic 106 is instructed to read data from one of the memory modules 102 by way of the appropriate memory controller 104 and write it to the cache 110 of a processor 108 in response to a cache miss for that cache 110. The coherency logic 106 also writes data from the cache 110 to one of the memory modules 102 by way of the appropriate memory controller 104 in response to an instruction to flush one or more rows of the cache 110.

In some implementations, a data fabric 112 is used such as the SCALABLE DATA FABRIC (SDF) from ADVANCED MICRO DEVICES (AMD). The data fabric 112 provides a data plane through which a plurality of components can each communicate with one another, such as processors 108, persistent storage devices, data buses, peripherals, graphics processing units (GPU), and the like. In such implementations, the processors 108 are connected to the memory controllers 104 and/or coherency logic 106 by way of the data fabric 112.

Each processor 108 is a central processing unit (CPU), graphics processing unit (GPU), or other type of processor. The processors 108 may be different processing cores of a multi-core processor. Each processor 108 is configured to read instructions from the memory module 102 and execute them in sequence. The processors perform any of the functions of a CPU as known in the art. The row hammer mitigation approach described herein operates in conjunction with one or more registers 114 storing data describing a current executing context, such as a process or thread. According to an implementation, the processor 108 further includes registers or memory implementing an error log 116 to which one or more components of the memory architecture 100 write data.

In some implementations, the memory controller 104 implements a port 118. The port defines input and or output lines by which the processor 108 and memory controller 104 exchange information in addition to commands, data to be written, and addresses to which data is to be written to or read from. The port 118 is, for example, used by the processor 108 to provide an execution context identifier (e.g., thread identifier) associated with a memory command input by the processor 108 to the memory controller 104. Example commands include, without limitation, a write command, a read command, and a command to allocate a block of memory to the execution context and to return a start address of the block of memory to the processor 108. The memory controller 104 stores an association between an address or block of addresses and the execution context identifier received from the processor 108. The memory controller 104 uses the port 118 to communicate information to the processor 108, such as error notifications. A row hammer alert according to the mitigation approach described herein and according to an implementation, is transmitted by the memory controller 104 to the processor 108 using the port 118.

In some implementations, coherency logic 106 and the data fabric 112 likewise implement ports 120, 122, respectively. The processor 108 may additionally or alternatively transmit the execution context associated with a command to one or both of ports 120, 122 as described above with respect to the port 118. The processor 108 may additionally or alternatively receive error notifications from one or both of ports 120, 122 as described above with respect to the port 118. For example, error notifications from a memory controller 104 are passed up to the coherency logic 106 and/or data fabric 112, which then forward the error notifications to the processor 108.

Inasmuch as there are multiple processors 108, each processor 108 is connected to any of the ports 118, 120, 122 that are implemented and be independently addressable. For example, for an execution context identifier received from a particular processor 108, error notifications referencing that execution context identifier may be transmitted to that processor 108. Error notifications transmitted from a port 118, 120, and/or 122 may be written to the error log 116 of the processor 108 to which the notifications are transmitted.

Memory Controller Logic for Detecting Row Hammer Attacks

Figure 2:
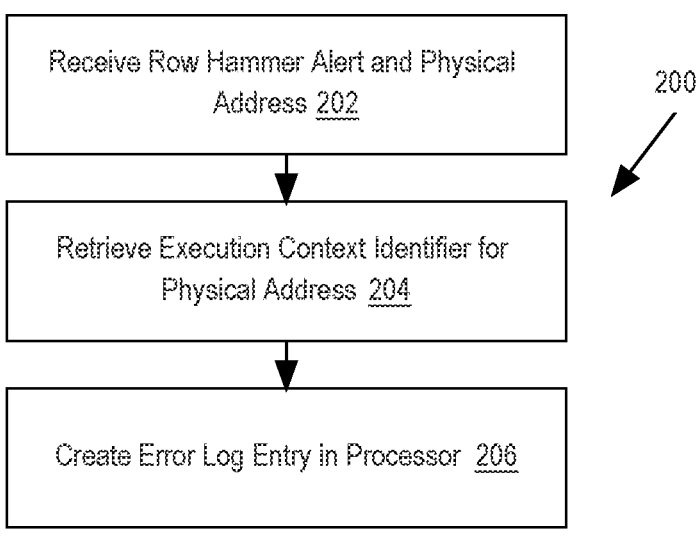
FIG. 2 is a process flow diagram of a method for processing row hammer alerts by one or more components of the memory architecture.

FIG. 2 depicts a method 200 performed by the memory controller 104 in response to detection of a row hammer event. As used herein "row hammer event" refers to a pattern of reads and/or writes to an aggressor row of a memory module 102 that is predefined as being a row hammer event according to the logic of the memory controller 104. Which pattern or patterns are identified as row hammer attacks may be determined by testing of memory modules having the same type as the memory module 102. For example, patterns of reads and/or writes are tested to determine which have an unacceptable probability of causing modification of non-addressed rows, e.g., greater than a predefined probability threshold. For some types of memory modules 102, normal patterns of reads and/or writes from legitimate software, as opposed to viruses or malware, match a predefined pattern and are still interpreted as row hammer events in order to hinder unintentional modification of non-addressed rows.

According to an implementation, the method 200 includes receiving 202 a row hammer alert and a physical address of an aggressor row. The physical address may be in the form of module index of a memory module 102 and a row index of the aggressor row. The physical address may also be an address from which the module and row index of the aggressor row were translated.

In response to receiving 202 the row hammer alert, the method 200 includes retrieving 204 the execution context identifier corresponding to the physical address. As noted above, in some implementations commands from a processor 108 are accompanied by an associated execution context received through the port 118. Accordingly, this execution context may be retrieved 204 from a stored mapping between execution context identifiers and corresponding addresses. Where the execution context identifiers are associated with blocks of addresses, the memory controller 104 may include logic for determining which block of addresses includes the address of the aggressor row and obtaining the execution context identifier associated with that block of addresses.

According to an implementation, the method 200 further includes creating 206 an error log entry 116 in the processor 108 Where there are multiple processors 108, the processor 108 in which the error log entry is created is the processor that requested allocation of the aggressor row or block of addresses including the aggressor row. In other implementations, notification of the row hammer alert is provided to the processor 108 by other means, such as in the form of a machine check exception (MCE), interrupt request (IRQ). For example, the memory controller 104 and its corresponding memory modules 102 may be an error reporting entity according to the memory check architecture (MCA). In some implementations, the processor retrieves the execution context identifier from the memory controller 104 in response to the row hammer alert The memory controller 104 is described above as performing the method 200. In other implementations, another component of the memory architecture 100 performs some or all of the steps of the method 200. For example, the coherency logic 106 performs the method 200 by communicating with the processor 108 by means of the port 120. The data fabric 112 performs the method 200 by communication with the processor 108 be means of the port 122. In some implementations, the memory controller 104 includes logic for identifying row hammer events and, in response, transmits an alert to one or both of the coherency logic 106 and data fabric 112. Either of the coherency logic 106 and data fabric 112 then creates an entry in the error log 116 in response to the row hammer alert. In other implementations, either of the coherency logic 106 and data fabric 112 include logic for detecting row hammer events and creating entries in the error log 106.

Mitigation Approach in Response to Row Hammer Alerts

Figure 3:
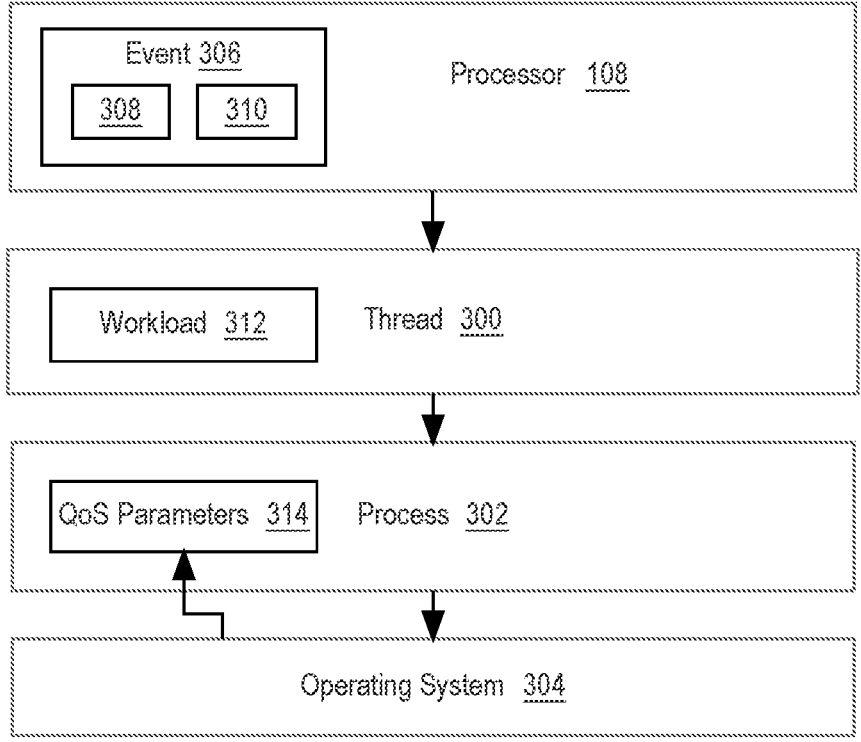
FIG. 3 is a schematic block diagram depicting components for processing row hammer alerts received from the memory architecture.

FIG. 3 depicts components of a computing device for mitigating row hammer attacks, such as in response to alerts received in accordance with the method 200. According to an implementation, the execution contexts executed by the processor 108 are threads 300 that are part of a process 302 that may include a plurality of threads 300. The process 302 may execute an application, network service, daemon, operating system service, or any executable that may be executed on a computing device. Launching and managing of the process 302 is performed by an operating system 304. Examples of the operating system 304 include WINDOWS, LINUX, MACOS, or the like. The operating system 304 provides functions for interfacing with the components of a computing device, standard libraries for use by processes 302, and executables for launching and managing processes 302 in response to user inputs, schedules, or predefined events. The operating system 304 may execute within a virtual machine that may itself be managed by a virtual machine manager (VMM). In the following description, the mitigation approach is described as being performed by the operating system 304 but may be performed in a like manner by a virtual machine or VMM.

The processor 108 generates an event 306 in response to an entry in the error log 116 that is created in response to row hammer alert. The event 306 includes one or more status bits 308, 310. For example, status bit 308 indicates that the event indicates a recoverable error. Status bit 310 indicates that the event has been delivered to the execution context that was executing when the recoverable error occurred. The event 306 is provided by the processor 108 to the execution context, e.g., thread 300, for processing. For example, the processor 108 checks the error log 116 as part of performing a context switch away from an execution context and, in response to an entry in the error log 116, creates the event 306.

The thread 300 may be executing a workload 312 when the row hammer alert occurred. The workload 312 may be executable code for performing a task delegated to the thread 300. In response to the event 306, the operating system 304 may cause the thread 300 to restart performing the workload 312.

According to an implementation, the process 302 has one or more quality of service (QoS) parameters 314. The QoS parameters 314 specify resources allocated to the process 302 and include a processor time parameter defining an amount of processing cycles allocated for execution of the process 302 by the one or more processors 108. The QoS parameters 314 specifies a number of memory commands that may be submitted by the process 302 within a given time window. For example, a process 302 is allocated a fraction of available memory commands executable by the memory architecture 100, e.g., on average over the time window, X percent of memory commands executed by the memory architecture 100 may be permitted to be from the process 302.

In response to receiving the event 306 from the processor 108 for the process 302, the operating system 304 adjusts the QoS parameters 314 of the process 302 to one or both of reduce the amount of processing cycles or memory commands allocated to the process 302. As one example, the value of X is reduced, such as X=0.5*X. In this manner, the ability of the process 302 to cause row hammer attacks will be reduced.

Figure 4:
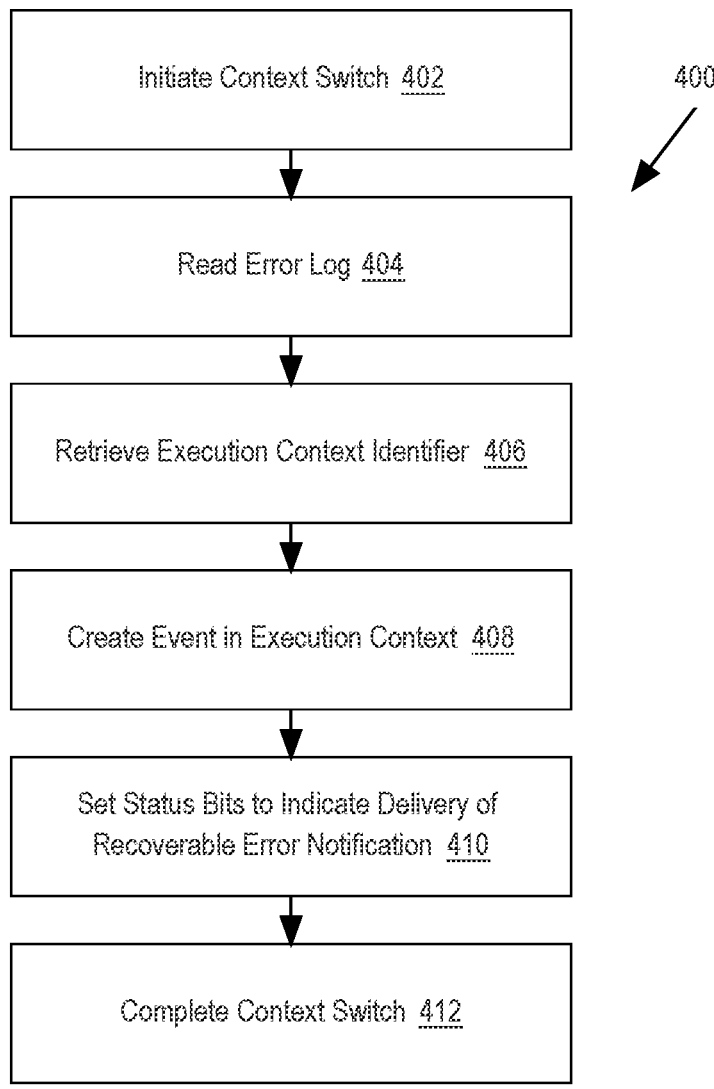
FIG. 4 is a process flow diagram of a method for processing row hammer alerts received from the memory architecture.

FIG. 4 depicts a method 400 executed by the processor 108 to mitigate row hammer attacks. The method 400 may include initiating 402 a context switch. For example, execution of instructions of a currently executed thread 300 may be stopped. The method 400 may include, as part of performing the context switch, reading 404 the error log 116. In response to an entry in the error log 116 indicating a row hammer alert, the processor 108 may retrieve 406 the execution context identifier from the entry, which may or may not be the same as the identifier of the thread 300 that was stopped at step 402.

The method 400 may include creating 408 an event 306 associated with the execution context identifier and setting 410 one or more bits of the event. As noted above, a bit 308 may be set to indicate that the event indicates a recoverable error and a bit 310 may be set to indicate that the recoverable error was delivered to the execution context in which the recoverable error occurred.

As noted above, some patterns of reads and/or writes may create a risk of row hammer but in fact be from a legitimate process 302. Accordingly, specifying that the error is recoverable may suppress ending of the process 302 by the operating system 304 and may further suppress rebooting of a computing device executing the process 302.

The processor 108 may then complete 412 the context switch. Completing 412 the context switch may include copying the contents of context registers 114 to any of the memory modules 102 or to the cache 110. Completing 412 the context switch may include loading values defining a different execution context into the context registers 114 from the cache 110 or any of the memory modules 102 and commencing execution of instructions of the different execution context. Any of the actions performed as part of performing a context switch may be performed before or after steps 404-410. For example, in some implementations, at least stopping execution of the current execution context is performed at step 402 and at least starting execution of the different execution context is not performed until step 412. Other steps performed as part of the context switch may be performed before or after steps 404-410.

According to an implementation, in response to the event created at step 408, the operating system 304 alters operation of the thread 300 and/or process 302 in order to mitigate subsequent row hammer attacks by the process 302. This action may be selected from the following options:

1. End the process 302 (e.g., send SIGBUS event)
2. Throttle the thread 300 or process 302 (e.g., reduce QoS parameters 314)
3. Restart the workload 312 of the thread 300.

According to an implementation, the mitigation action is performed as part of the context switch performed prior to starting execution of the different execution context. The operating system 304 tracks row hammer alerts received over time for the process 302 and escalates each time a row hammer alert is received. For example, for a first row hammer alert, a first level of throttling is performed. For a second row hammer alert, a second, greater, level of throttling is performed. For a third row hammer alert, the process 302 is ended and the executable being executed by the process 302 is flagged as having excessive row hammer risk.

The executable may be malware that needs to be removed or as a legitimate application that will need to be modified to prevent row hammer events.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, by a memory component from a storage device, a row hammer notification, the row hammer notification including an address of an aggressor row;
    associating, by the memory component, the address with a thread identifier;
    creating, by the memory component, an error log entry including the thread identifier;
    retrieving, by a processing device, the error log entry upon performing a context switch;
    generating, by the processing device, an event in response to the error log entry, the event indicating a recoverable error for the thread identifier;
    receiving, by an operating system executing on the processing device, the event; and
    in response to the event, altering, by the operating system, operation of a thread associated with the thread identifier.

2. The method of claim 1, wherein altering operation of the thread associated with
    the thread identifier comprises one or more of:
    ending execution of the thread associated with the thread identifier;
    restarting a workload performed by the thread associated with the thread identifier; or
    reducing resources allocated to the thread associated with the thread identifier, the resources including one or more of processing time or memory commands with respect to the storage device.

* * * * *